United States Patent
Lau et al.

(10) Patent No.: US 6,365,878 B1
(45) Date of Patent: Apr. 2, 2002

(54) ELECTRIC COOKING APPARATUS

(75) Inventors: Joseph Wing Chung Lau, Pokfulam; Chi Leung Ho, New Territories, both of (HK)

(73) Assignee: Eastern Sources Housewares (Hong Kong) Limited (HK)

( * ) Notice: Subject to any disclaimer, the term of this patent is extended or adjusted under 35 U.S.C. 154(b) by 0 days.

(21) Appl. No.: 09/641,682

(22) Filed: Aug. 18, 2000

(30) Foreign Application Priority Data

Sep. 16, 1999 (GB) .............................. 9921949

(51) Int. Cl.⁷ ................................. A47J 37/12
(52) U.S. Cl. ..................... 219/430; 219/432; 219/436; 99/403
(58) Field of Search ................... 219/430, 432, 219/436; 99/403

(56) References Cited

U.S. PATENT DOCUMENTS

| | | | | |
|---|---|---|---|---|
| 2,269,689 A | * | 1/1942 | Reichold .................... | 219/435 |
| 2,543,052 A | * | 2/1951 | Park ........................... | 219/432 |
| 4,713,522 A | * | 12/1987 | Kimura et al. .............. | 219/432 |

FOREIGN PATENT DOCUMENTS

| | | |
|---|---|---|
| EP | 0587300 A1 | 3/1994 |
| EP | 0783861 A1 | 7/1997 |
| EP | 0891736 A1 | 1/1999 |
| GB | 2255002 A | 10/1992 |
| GB | 2293755 A | 4/1996 |
| GB | 2298780 A | 9/1996 |
| GB | 2321177 A | 7/1998 |
| GB | 2321178 A | 7/1998 |

\* cited by examiner

*Primary Examiner*—Joseph Pelham
(74) *Attorney, Agent, or Firm*—Burns, Doane, Swecker & Mathis, L.L.P.

(57) ABSTRACT

There is provided an electric frying apparatus (10, 200) including a heating coil (32), an oil tank (14) for cooking food, and a housing (12), in which the heating coil (32) is in a heat-transferable relationship with the oil tank (14), and the apparatus (10, 200) is adapted to be in an operable state when at least part of the heating coil (32) is received within the housing (12). The electric frying apparatus (10, 200) also includes a frying basket (16) for supporting the food for frying within the oil tank (14), in which the basket (16) is releasably engageable with the housing (12), and the basket (16) includes a protruding part (82) for securing the basket (16) against movement relative to the housing (12). The electric frying apparatus (200) also includes a temperature sensor connected with a liquid crystal display (LCD) 202. The temperature sensor senses the temperature within the oil tank (14) and such a temperature is visually displayed by the LCD (202).

12 Claims, 14 Drawing Sheets

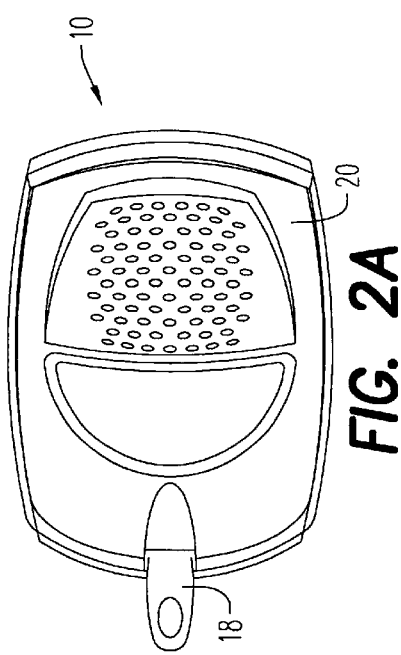
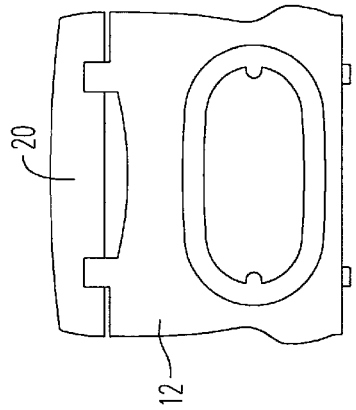
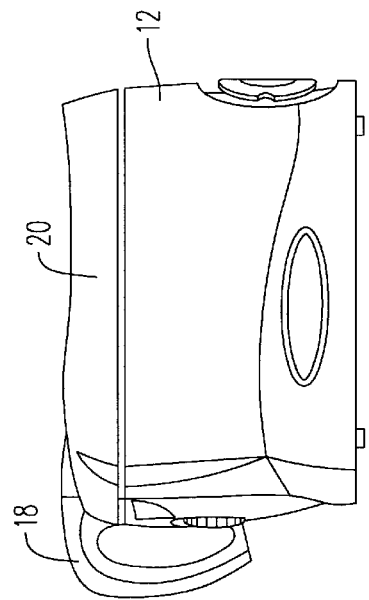
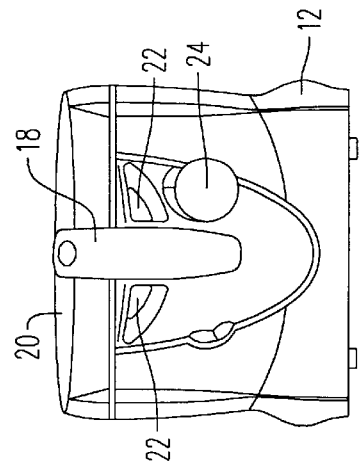

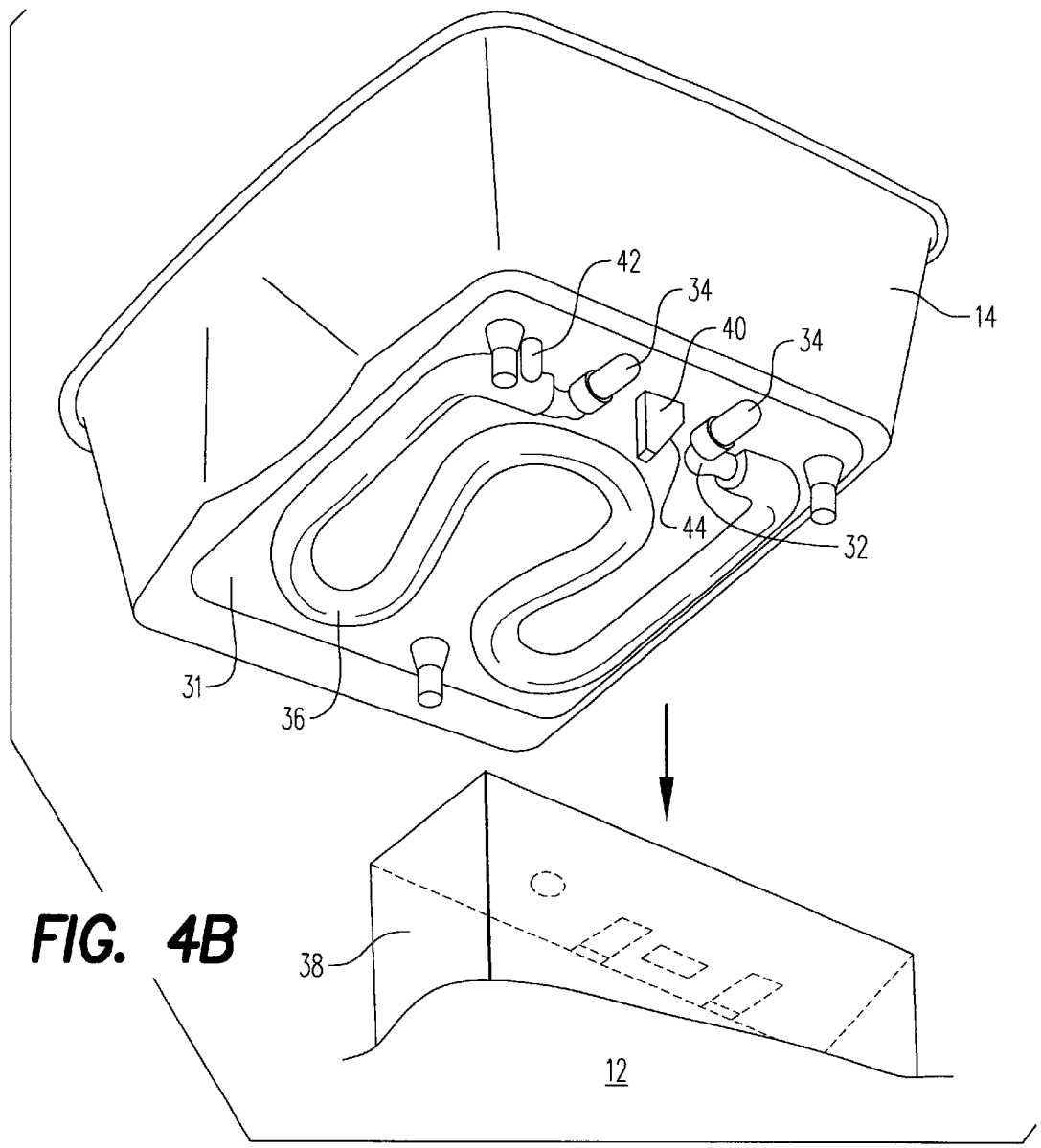

ELECTRIC COOKING APPARATUS

This application claims priority under 35 U.S.C. §§119 and/or 365 to 9921949.5 filed in the United Kingdom on Sep. 16, 1999; the entire content of which is hereby incorporated by reference.

This invention relates to an electric cooking apparatus and, in particular an electric frying apparatus.

For electric frying apparatus, since the contents therein, e.g. oil, may be heated to a very high temperature, e.g. well over 100° C., one cannot overlook its safety during operation. When a certain component, e.g. the oil container, is damaged, users may not approach the manufacturer for a proper replacement, but instead use some other containers. As such other containers are not intended for use in frying apparatus, and may not therefore be able to stand high temperature, danger and accidents may therefore result.

In addition, such frying apparatus usually includes a basket for holding and supporting the food to be fried. After frying, the basket will become very hot. If the basket can be easily removed from the apparatus, e.g. by a child, the child may be hurt by the heat of the basket, or by the hot oil dripped from the basket.

It is thus an object of the present invention to provide an electric cooking apparatus in which the above shortcomings are mitigated, or at least to provide a useful alternative to the public.

According to a first aspect of the present invention, there is provided an electric cooking apparatus including heating means, a chamber member defining a cavity for cooking food, and a base member, wherein said heating means is in a heat-transferable relationship with said chamber member, characterized in that said apparatus is adapted to be in an operable state when at least part of said heating means is received within said base member.

According to a second aspect of the present invention, there is provided an electric cooking apparatus including heating means, a chamber member defining a cavity for cooking food, a base member, and means for supporting said food for cooking within said chamber member, wherein said heating means is in a heat-transferable relationship with said chamber member, wherein said supporting means is releasably engageable with said base member, further characterized in that said supporting means includes means for securing said supporting means against movement relative to said base member.

According to a third aspect of the present invention, there is provided an electric cooking apparatus including heating means and a chamber member defining a cavity for cooking food, characterized in that said apparatus includes means for sensing the temperature in the chamber member, and means for indicating said temperature.

The invention will now be described, by way of examples only, with reference to the accompanying drawings, in which:

FIG. 2A is a top view of the electric frying apparatus shown in FIG. 1;

FIG. 2B is a front view of the electric frying apparatus shown in FIG. 1;

FIG. 2C is a side view of the electric frying apparatus shown in FIG. 1;

FIG. 2D is a rear view of the electric frying apparatus shown in FIG. 1;

FIG. 4B is a bottom perspective view showing the oil tank and part of the housing of the electric frying apparatus shown in FIG. 4A;

Figure 1:
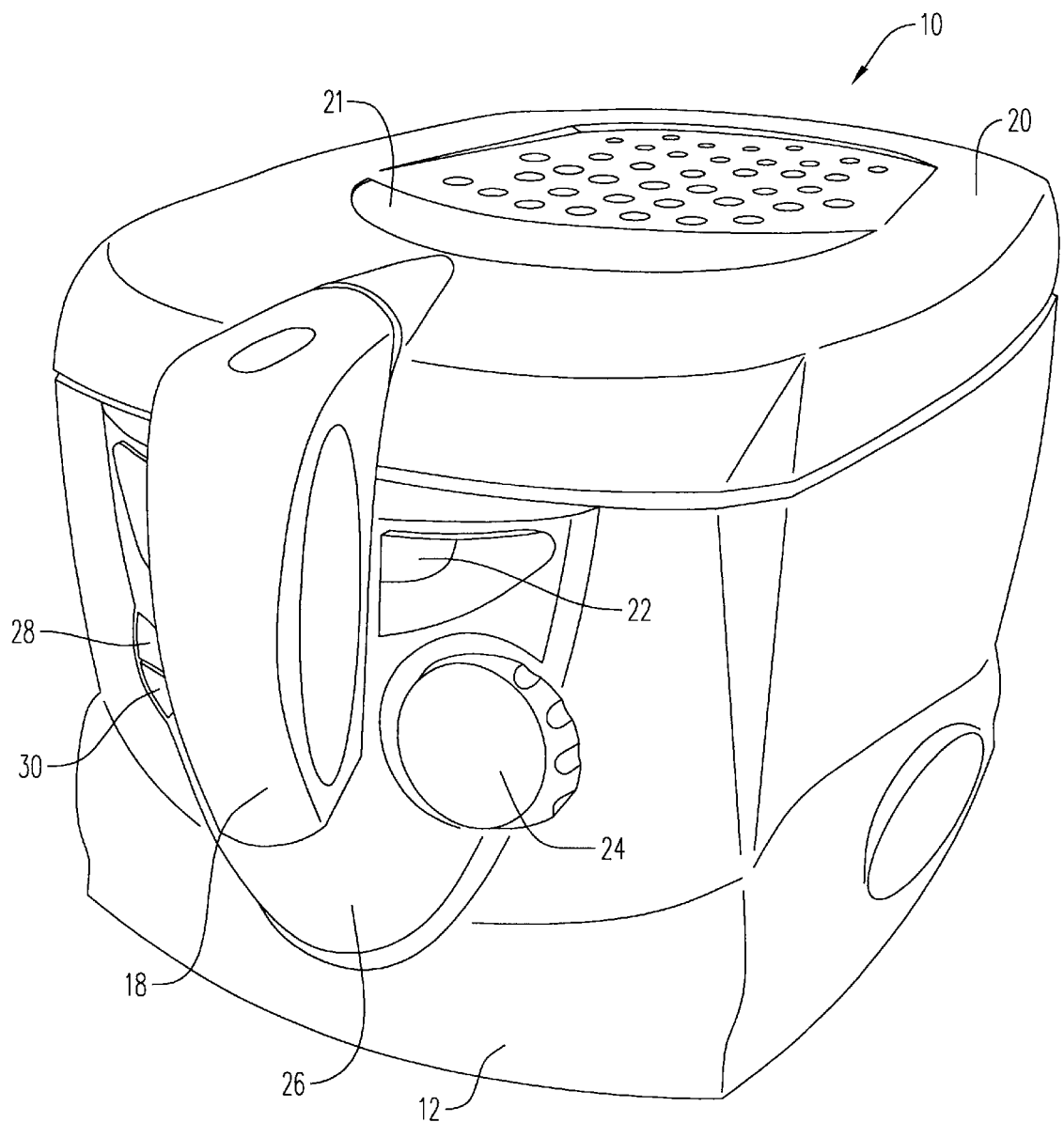
FIG. 1 is a perspective view of a first embodiment of an electric frying apparatus according to the present invention.
Figure 5A:
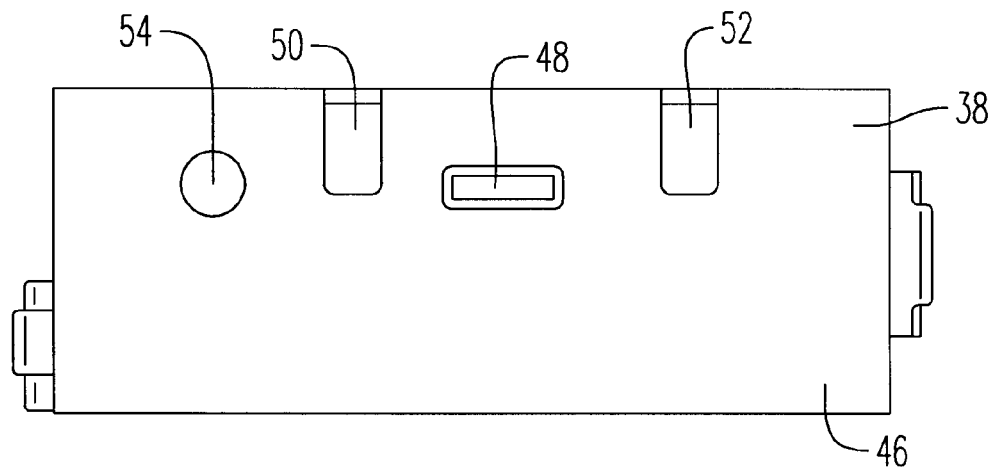
FIG. 5A is a top view of the connection unit of the housing of the electric frying apparatus shown in FIG. 1.
Figure 5B:
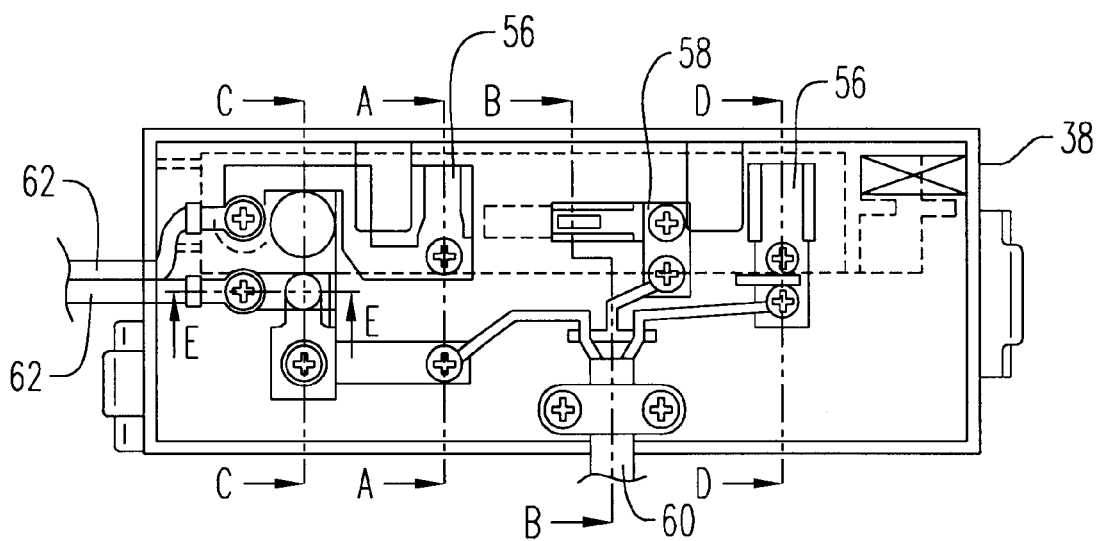
FIG. 5B is a top view of the interior of the connection unit shown in FIG. 5A, with the cover removed.
Figure 7A:
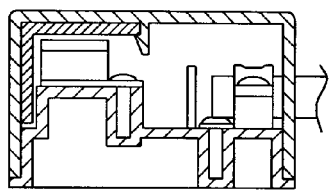
FIG. 7A shows a sectional view of the connection unit along the line A—A in FIG. 5B, and with the cover.
Figure 7B:
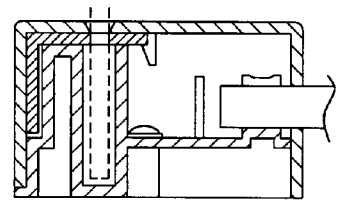
FIG. 7B shows a sectional view of the connection unit along the line B—B in FIG. 5B, and with the cover.
Figure 7C:
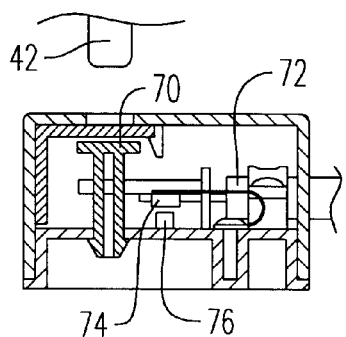
FIG. 7C shows a sectional view of the connection unit along the line C—C in FIG. 5B, and with the cover, when the relevant pin is not received therein.
Figure 7C:
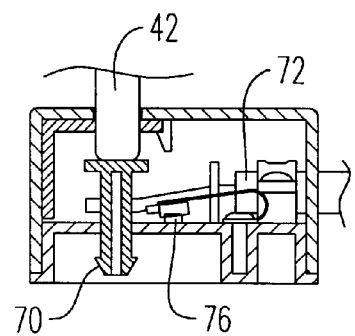
Figure 7D:
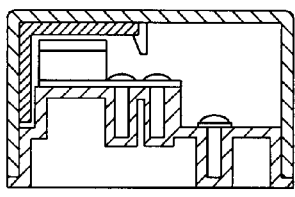
Figure 7E:
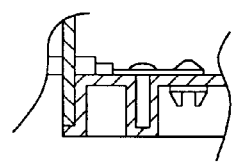
Figure 8A:
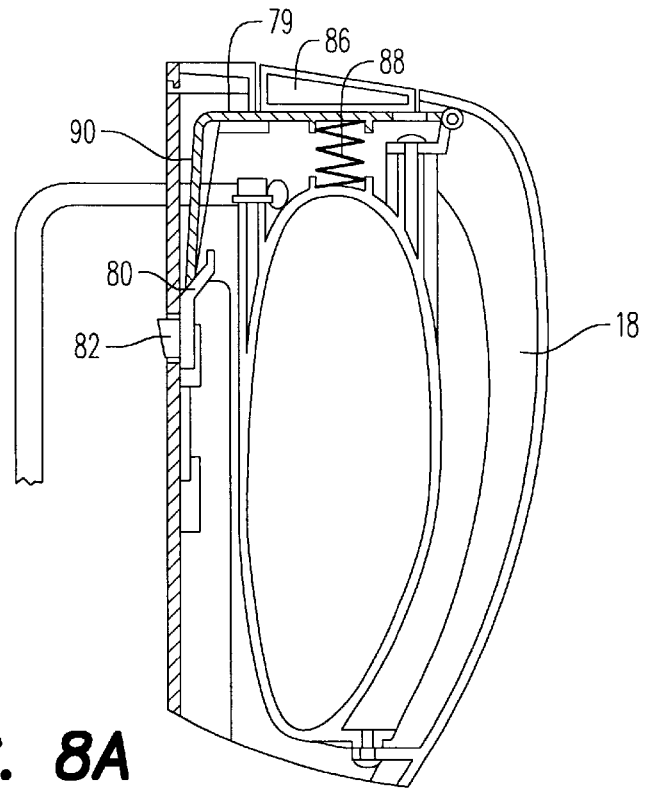
Figure 8B:
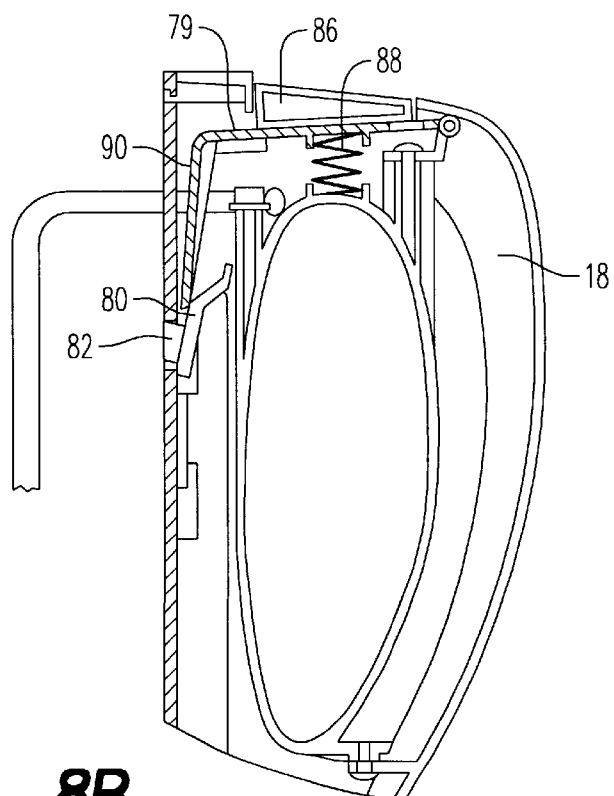
Figure 9A:
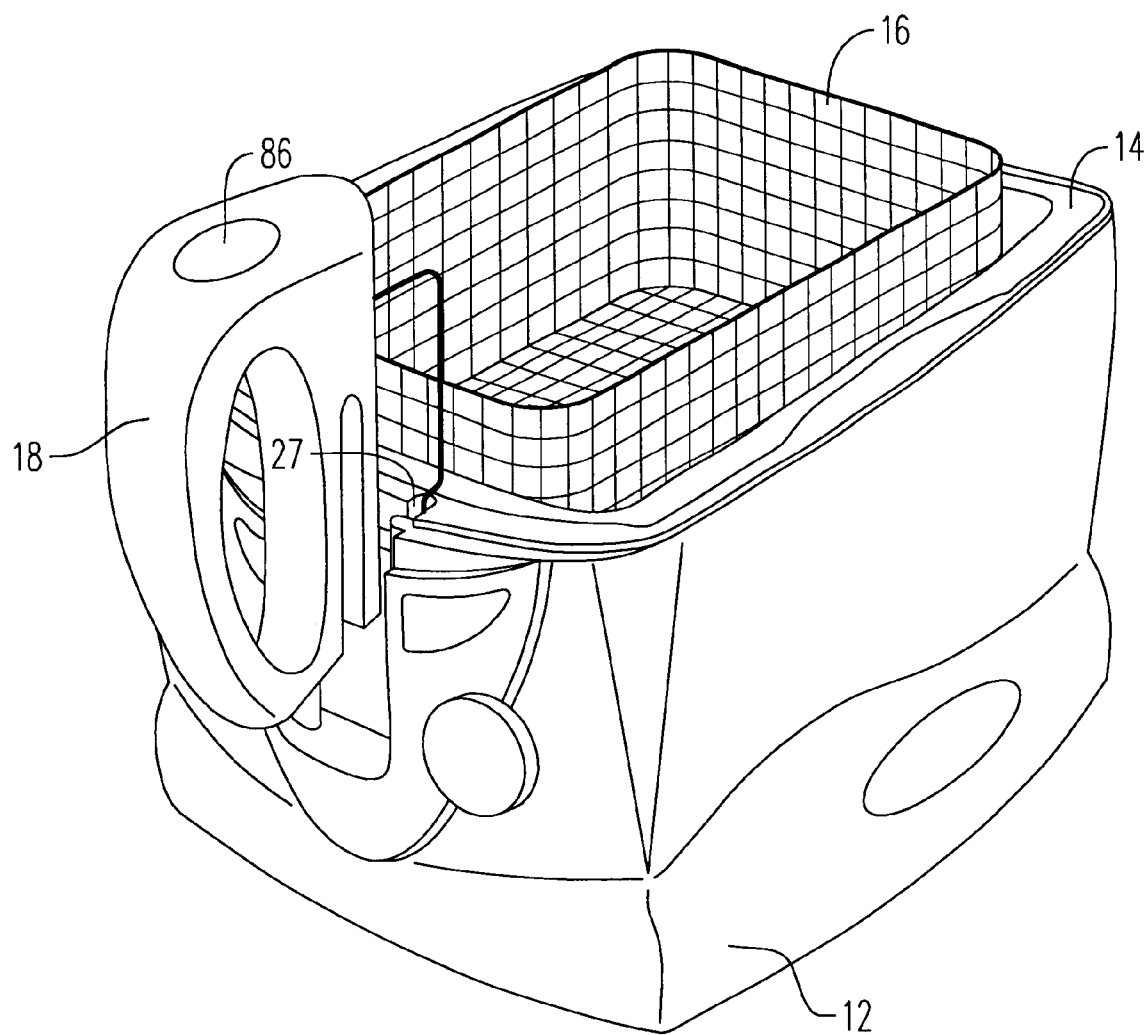
Figure 9B:
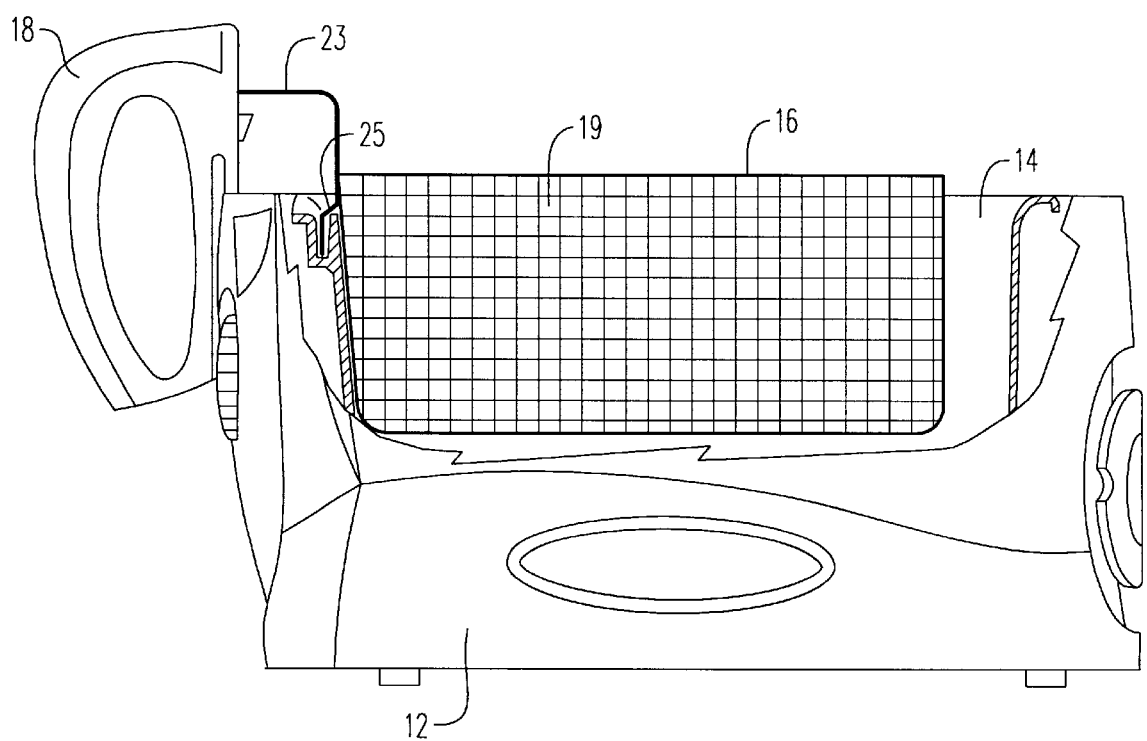
Figure 10:
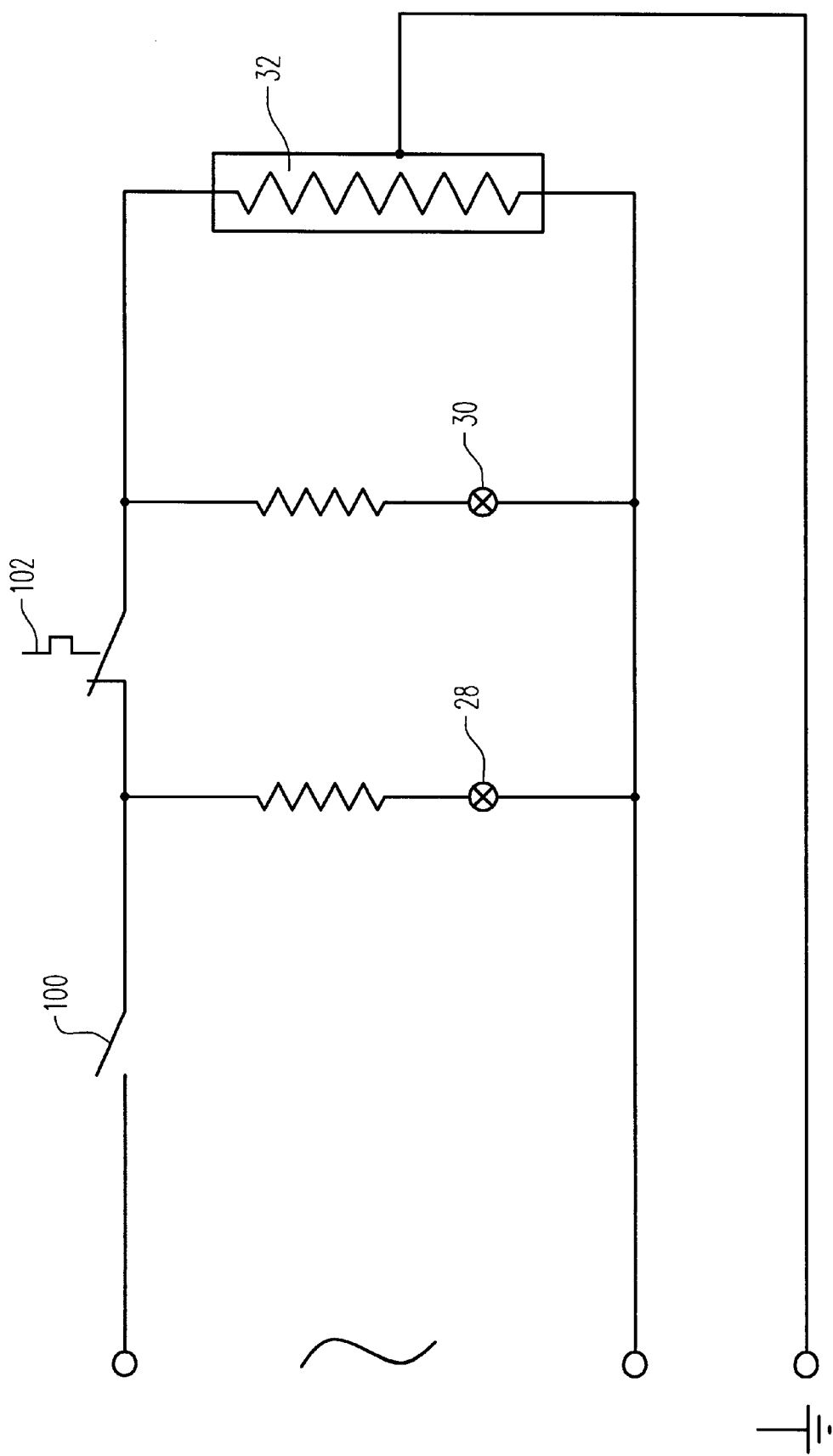
Figure 11A:
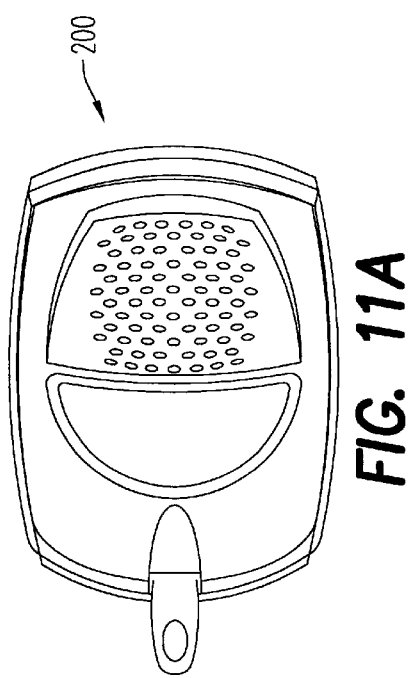
Figure 11D:
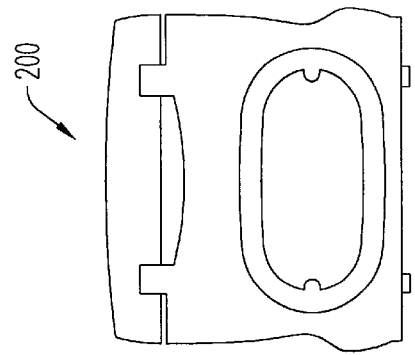
Figure 11C:
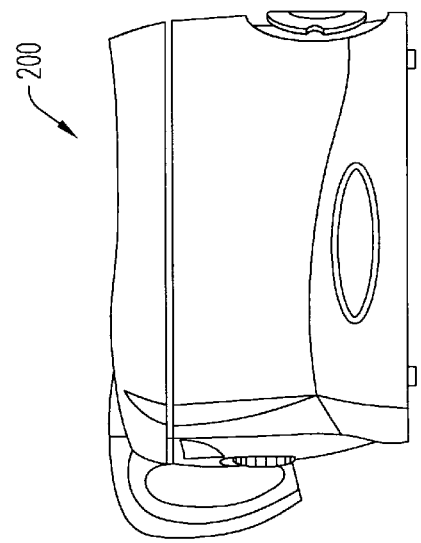
Figure 11B:
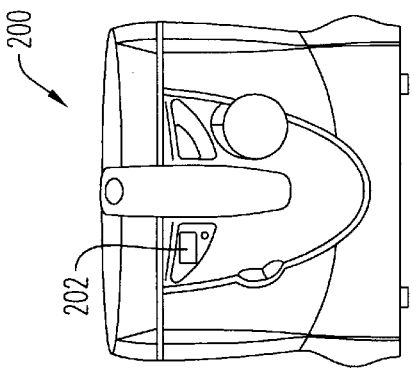

FIG. 7C' shows a sectional view of the connection unit along the line C—C in FIG. 5B, and with the cover, when the relevant pin is received therein;

FIG. 7D shows a sectional view of the connection unit along the line D—D in FIG. 5B, and with the cover;

FIG. 7E shows a sectional view of the connection unit along the line E—E in FIG. 5B, and with the cover;

FIG. 8A shows a first position of the engagement/ disengagement mechanism of the basket of the electric frying apparatus shown in FIG. 1;

FIG. 8B shows a second position of the engagement/ disengagement mechanism of the basket shown in FIG. 8A;

FIG. 9A is a perspective view showing the basket in a raised position relative to the housing of the electric frying apparatus shown in FIG. 1;

FIG. 9B is a partially sectioned side view of the basket in a raised position relative to the housing of the electric frying apparatus as shown in FIG. 9A;

FIG. 10 shows a schematic diagram of an electric circuit of the electric frying apparatus shown in FIG. 1;

FIG. 11A shows a top view of a second embodiment of an electric frying apparatus according to the present invention;

FIG. 11B shows a front view of the electric frying apparatus shown in FIG. 11A;

FIG. 11C shows a side view of the electric frying apparatus shown in FIG. 11A; and FIG. 11D shows a rear view of the electric frying apparatus shown in FIG. 11A.

Figure 3:
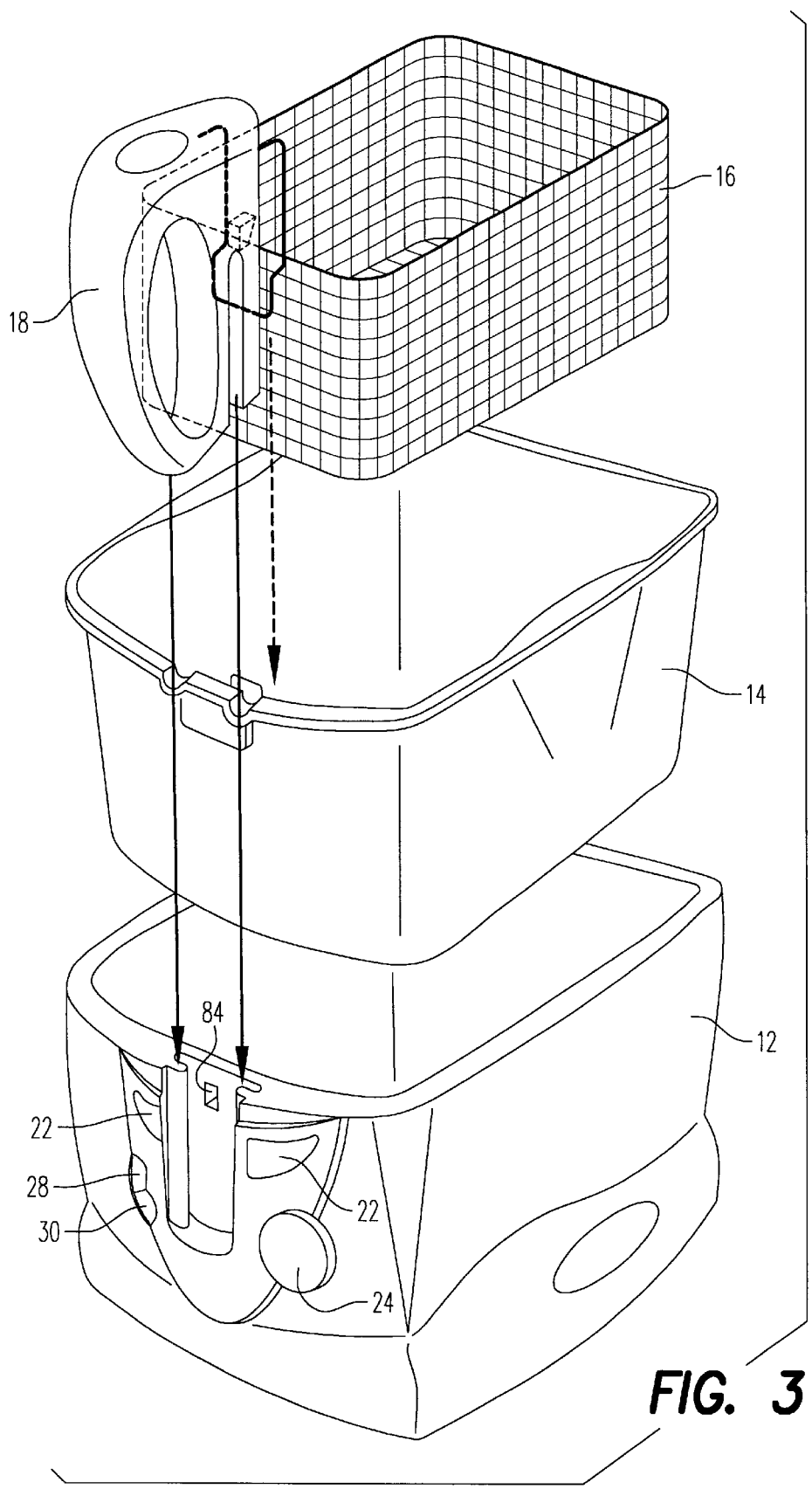
FIG. 3 is an exploded perspective view of the electric frying apparatus shown in FIG. 1.

A first embodiment of an electric frying apparatus according to the present invention is shown in FIGS. 1 to 3, and generally designated as 10. The frying apparatus 10 includes a housing 12 made of plastics materials, e.g. polypropylene. A cast aluminium oil tank 14 (see FIG. 3) may be received within and engaged with the housing 12. Oil may be contained in the oil tank 14 for heating, so as to fry food contained in the oil tank 14. The use of cast aluminium allows for easy heating up and even heat distribution. The oil tank 14 is also coated with a non-stick material. The four upward comers of the oil tank 14 are each formed as a spout to enhance pouring out of oil from the oil tank 14. There is also provided a frying basket 16 formed of a meshed material, and secured with a handle 18. Food may thus be held in the basket 16 and lowered into the oil tank 14 for frying.

When the housing 12, the oil tank 14 and the basket 16 are properly assembled, a removable lid 20 may be secured to the apparatus 10. The lid 20 includes a transparent window 21 which enables a user to inspect the frying status in the apparatus 10. The lid 20 may be released from the apparatus 10 upon actuation of any one or both of two buttons 22. A knob 24 provided on a front panel 26 of the housing 12 is operable to control the operation, e.g. on/off and operating temperature, of the apparatus 10. Also provided on the front panel 26 are two indicator lights 28, 30, the former for indicating that the apparatus 10 is operating, i.e. in an "ON" state, and the latter indicating that a heating coil (to be discussed below) is heating up.

Figure 4A:
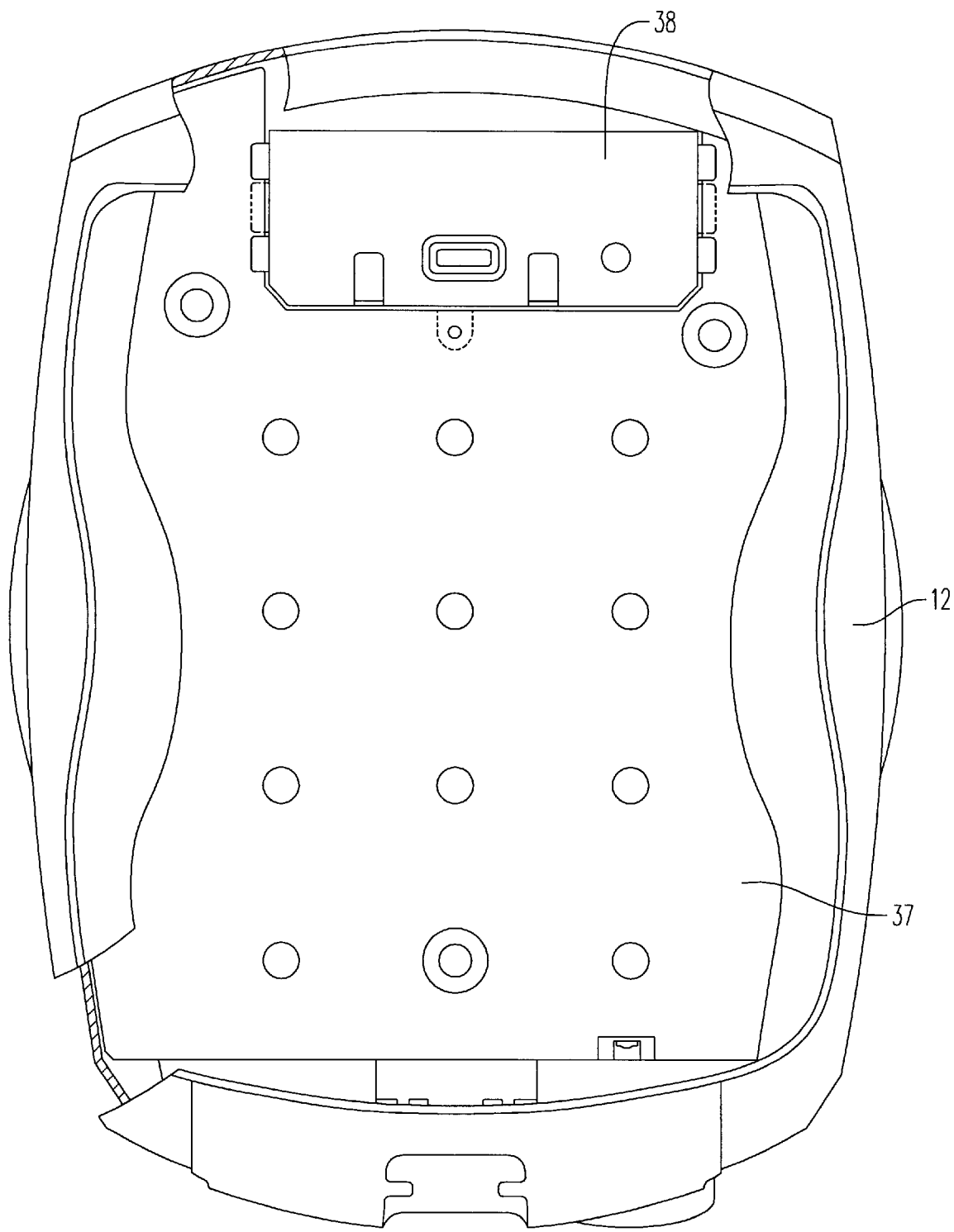
FIG. 4A is a partially sectioned top view of the electric frying apparatus shown in FIG. 1.

As shown in FIG. 4A, provided within the housing 12 is a metal plate 37 on which a connection unit 38 (the function of which will be discussed below) is positioned. As can be seen in FIG. 4B, fixedly secured to an underneath surface 31 of the oil tank 14 is a heating coil 32. The heating coil 32 is in a heat-transferable condition, e.g. in physical contact, with the oil tank 14, so that when the heating coil 32 heats up upon connection with an electricity source, the oil tank 14 will also heat up, so as to raise the temperature of the contents, e.g. oil, therein. Two ends 34 of the heating coil 32 are exposed from a protecting cover 36 for engagement and electrical contact with the connection unit 38 in the housing 12, in a manner to be discussed below.

Also provided on the underneath surface 31 of the oil tank 14 are two protrusions 40, 42. The protrusion 42 is cylindrical in shape. As to the protrusion 40, such is made of metal and includes a beveled edge 44, which assists in inserting the protrusion 42 into the connection unit 38. It can be seen that while the protrusions 40, 42 extend away from the underneath surface 31 of the oil tank 14, the ends 34 of the heating coil 32 extend generally parallel to the underneath surface 31.

When the oil tank 14 is properly engaged with the connection unit 38 of the housing 12, the ends 34 of the heating coil 32 are in electrical connection with the rest of the electric circuit, so that when the apparatus 10 is connected to an electricity source, e.g. the mains, the apparatus 10 is in an operable state. In particular, in such a situation, the apparatus 10 can be turned on, thus allowing the heating coil 32 to heat up.

As shown in FIGS. 5A and 5B, the connection unit 38 has an upper cover 46 with four apertures 48, 50, 52, 54. The aperture 48 is for receiving the protrusion 40, which acts as the earth pin, the apertures 50 and 52 are for receiving the ends 34 of the heating coil 32, and the aperture 54 is for receiving the protrusion 42. When the ends 34 are received into the apertures 50, 52, they are in physical contact with metal clips 56 and thus establish electrical connection with the rest of the circuit of the apparatus 10. When the protrusion 40 is received within the aperture 48, the protrusion 40 comes into contact with a metal plate 58, which is in electrical connection with the earth wire of an electric cable 60, which leads ultimately to an electrical source, e.g. the mains. Electricity is supplied to other parts of the apparatus 10, e.g. indicator lamps 28, 30, via electric wires 62. However, if the oil tank 14 is not properly engaged with the connection unit 38, or the ends 34 are not in proper contact with the metal plates 56, the apparatus 10 will not be operable.

Figure 6A:
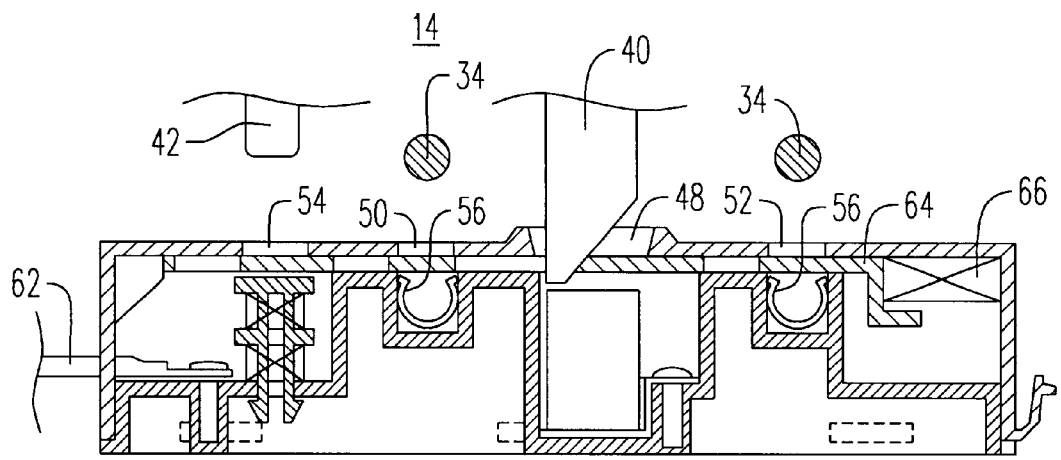
FIGS. 6A to 6D show stages during engagement of the various pins of the oil tank with the connection unit of the housing of the electric frying apparatus shown in FIG. 1.
Figure 6B:
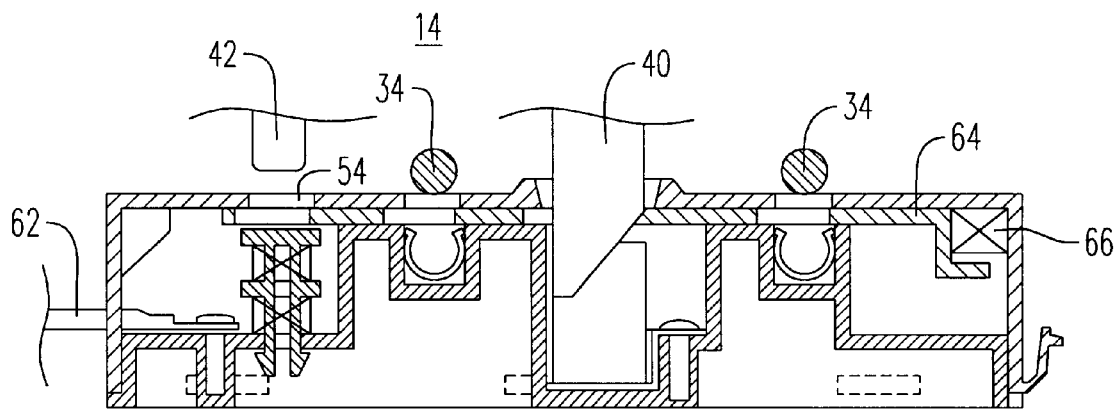
Figure 6C:
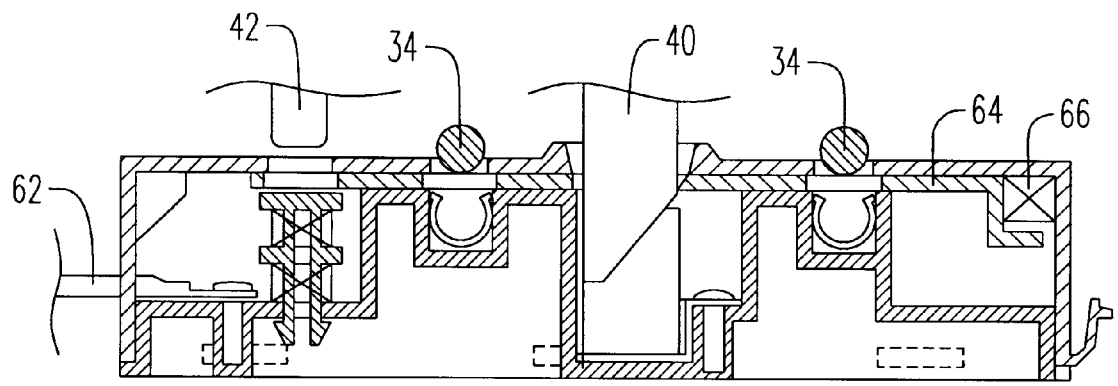
Figure 6D:
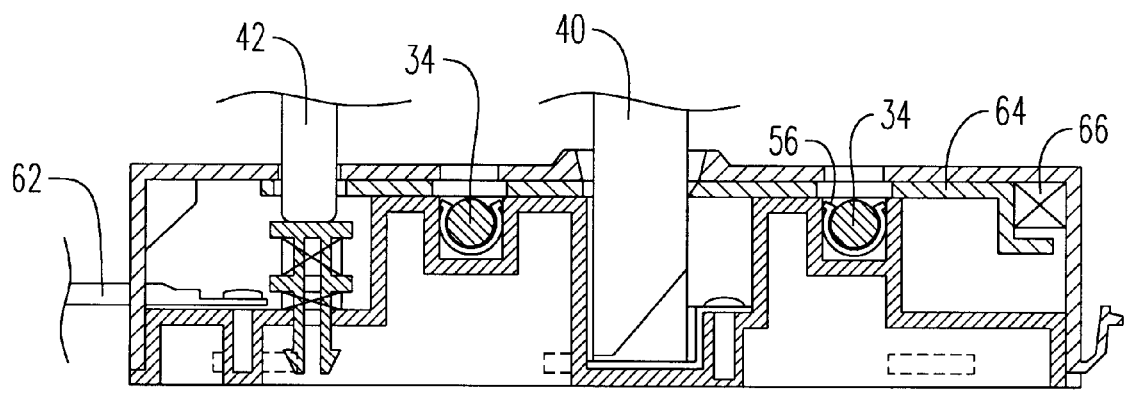

As can be seen in FIGS. 6A to 6D, the connection unit 38 includes a shielding plate 64 which is biased by a spring 66 towards the position as shown in FIG. 6A. In this position, solid portion of the plate 64 will occupy the positions below the apertures 48, 50, 52, 54. In this position, objects are prevented from entering the apertures 48, 50, 52, 54. The plate 64 is moved against the biasing force of the spring 66 by virtue of insertion of the protrusion 40, to the position as shown in FIGS. 6B to 6D, in which corresponding apertures on the plate 64 lie below the apertures 48, 50, 52, 54. In such a situation, the ends 34 may then be received into the connection unit 38, and be engaged with the clips 56, for establishing electrical contact therewith, as shown in FIG. 6D.

FIGS. 7A to 7E show various sectional views of the connection unit 38 (with the cover). Referring in particular to FIGS. 7C and 7C', it can be seen that when the protrusion 42 is out of the connection unit 38, a plunger 70 is at its upper position. Engaged with the plunger 70 is an end of a clip 72. The clip 72 includes a metal contact nib 74. When the protrusion 42 is inserted into the aperture 54, the plunger 70 is moved down, thereby bring the contact nib 74 into contact with a corresponding metal contact nib 76 in the connection unit 38. The apparatus 10 can only be in an operable state when the nibs 74 and 76 are in electrical contact. By way of such an arrangement, even if it is possible to move the plate 64 to the position as shown in FIGS. 6B to 6D, and to establish electrical contact between the ends 34 of the heating coil 32 with the clips 56, if in the absence of the protrusion 42, the plunger 70 cannot be moved down to bring the nibs 74 and 76 into electrical contact. This arrangement thus serves as a second switching mechanism, and thus a further safety measure.

As can be seen in FIGS. 8A and 8B, the handle 18 of the frying basket 16 includes an engagement/disengagement mechanism 79. The engagement/disengagement mechanism 79 includes a resilient tab 80 which carries a protruding part 82. The tab 80 is biased towards the position as shown in FIG. 8A. In this position, the protruding part 82 of the tab 80 extends beyond the handle 18. The protruding part 82 may in this position be received into a recess 84 of the housing 12 (see FIG. 3), and thereby to lock the basket 16 to the housing 12, against relative movement between the basket 16 and the housing 12.

On the upper side of the handle 18 is a button 86 which may be operated by a thumb of a user. Below the button 86 is a spring 88, and a ledge 90 is provided between the button 86 and the spring 88. The spring 88 biases the ledge 90 and the button 86 towards the position as shown in FIG. 8A. If the button 86 is pushed down to the position as shown in FIG. 8B, a free end of the ledge 90 will move to the position as shown in FIG. 8B, move the tab 80, and eventually the protruding part 82 to the position as shown in solid lines in FIG. 8B. In such a position, the frying basket 16 may be released from the housing 12. Upon release of the downward force on the button 86, the spring 88 will move the button 86 back to its position as shown in FIG. 8A upon the biasing force of the spring 88. With the movement of the free end of the ledge 90 away from the tab 80, the tab 80 will, upon its own biasing force, move the protruding part 82 back to its position as shown in FIG. 8A. The engagement/disengagement mechanism 79 may thus be operated to selectively engage the basket 16 with the housing 12, or engage the basket 16 from the housing 12.

By way of the above arrangement, the basket 16 may rest on the apparatus 10, as shown in FIGS. 9A and 9B. As shown more clearly in FIG. 9B, the handle 18 of the basket 16 is secured with a basket portion 19 via two bent wires 23, of which only one is shown in FIG. 9A. Each of the wires 23 includes a knee portion 25 which may rest on one of two recessed portions 27 of the oil tank 14. The basket 16 may thus be supported on the oil tank 14 in a raised position.

As shown in FIG. 10, the apparatus 10 includes a switch 100, which is embodied in the apparatus 10 by the nibs 74 and 76 shown in FIGS. 7C and 7C', connected in series with an adjustable thermostat 102. The thermostat 102 may be adjusted to control the operating temperature of the heating coil 32. Indicator lamps 28, 30 are provided for indicating respectively that the switch 100 is closed (thus the apparatus 10 is in an operable state), and that the thermostat 102 is operating.

FIGS. 11A to 11D show a second embodiment of an electric frying apparatus 200 according to the present invention. The main difference between this frying apparatus 200 and the frying apparatus 10 is that in the frying apparatus 200, a liquid crystal display (LCD) 202 is provided to act as both a time indicator and a temperature indicator. In the first place, this allows a user to set a time period for which the food is to be fried, and upon expiration of the time period, a signal (e.g. an audible sound) may be produced to alert the user that the set time has expired.

In addition, a temperature sensing device is incorporated in the apparatus 10 so as to sense the temperature in the oil tank 14. An appropriate temperature sensing device may be a diode temperature sensor or a transistor temperature sensor traded by Shenzhen City Guo Xin Tung Technology Enterprises Co., Ltd., of China. Such a sensor is connected to the LCD 202 so as to enable the LCD 202 to visually indicate to the user the temperature in the oil tank 14, e.g. in ° C. or F. Such provides the user with an accurate indication of the temperature of the oil in the oil tank 14, and thus enhances the control of the temperature at which the food is treated/fried.

What is claimed is:

1. An electric cooking apparatus including heating means having two ends, a chamber member define a cavity for cooking food, and a base member having first and second apertures for receiving the respective ends of said heating means, and further including a cover member which is movable between a first position in which said first and second apertures are shielded, and a second position in which said apertures are open, wherein said heating means is in a heat-transferable relationship with said chamber member, and said apparatus is adapted to be in an operable state when at least part of said heating means is received within said base member.

2. An apparatus according to claim 1 wherein said heating means is adapted to be in an electrically conductive relationship with said apparatus when said part of said heating means is received within said base member.

3. An apparatus according to claim 1 wherein said heating means is carried by said chamber member.

4. An apparatus according to claim 3 wherein said heating means is fixedly secured to said chamber member.

5. An apparatus according to claim 1 wherein said chamber member is releasably engageable with said base member.

6. An apparatus according to claim 1 further including means for biasing said cover member towards said first position.

7. An apparatus according to claim 1 wherein said base member includes a third aperture for receiving at least part of a first protruding member of said chamber member.

8. An apparatus according to claim 7 wherein said first protruding member is an earth pin.

9. An apparatus according to claim 7 wherein said cover member is moved from said first position to said second position upon entry of said first protruding member into said third aperture.

10. An apparatus according to claim 7 wherein said base member includes a fourth aperture for receiving at least part of a second protruding member of said chamber member.

11. An apparatus according to claim 10 wherein said part of second protruding member of said chamber member is receivable within said fourth aperture for closing a switch member, and thereby to allow said apparatus to be in an operable state.

12. An apparatus according to claim 1 wherein said ends of said heating means extend substantially parallel to a bottom of said chamber member.

* * * * *